(12) United States Patent
Asanuma (10) Patent No.: US 6,782,730 B2
(45) Date of Patent: Aug. 31, 2004

(54) INSPECTION MASTER BLOCK AND METHOD OF PRODUCING THE SAME

(75) Inventor: Susumu Asanuma, Hamamatsu (JP)

(73) Assignee: Asanuma Giken Co., Ltd., Shizuoka-ken (JP)

(*) Notice: Subject to any disclaimer, the term of this patent is extended or adjusted under 35 U.S.C. 154(b) by 90 days.

(21) Appl. No.: 09/959,364

(22) PCT Filed: Feb. 13, 2001

(86) PCT No.: PCT/JP01/00965

§ 371 (c)(1), (2), (4) Date: Jan. 28, 2002

(87) PCT Pub. No.: WO01/63205

PCT Pub. Date: Aug. 30, 2001

(65) Prior Publication Data

US 2002/0157449 A1 Oct. 31, 2002

(30) Foreign Application Priority Data

Feb. 22, 2000 (JP) .......................... 2000-044187
Feb. 6, 2001 (JP) .......................... 2001-028999

(51) Int. Cl.[7] ................................. B25J 1/00
(52) U.S. Cl. ........................................ 73/1.79
(58) Field of Search ................ 73/1.75, 1.79, 73/1.81; 33/644, 502, 503

(56) References Cited

U.S. PATENT DOCUMENTS 4,932,136 A 6/1990 Schmitz et al.
4,962,591 A * 10/1990 Zeller et al. ............... 73/1.79
5,125,261 A * 6/1992 Powley ..................... 73/1.81
5,400,638 A * 3/1995 Kim ......................... 73/1.79
5,983,512 A 11/1999 Trapet
6,023,850 A 2/2000 Trapet

FOREIGN PATENT DOCUMENTS

| DE | 196 11 617 A1 | 9/1997 |
| EP | 0 660 073 A1 | 6/1995 |
| JP | 59-80708 | 5/1984 |
| JP | 04-160301 | 6/1992 |
| JP | 09-329402 | 12/1997 |
| JP | 11-044527 | 2/1999 |

* cited by examiner

Primary Examiner—Robert Raevis
(74) Attorney, Agent, or Firm—Browdy and Neimark, P.L.L.C.

(57) ABSTRACT

A plurality of fixing holes are made in the upper and side faces of a hollow rectangular prism block body at least the top and four side faces of which are quartz glass or monocrystalline quartz rectangular plates. A plurality of reference members, each having a reference measuring face with which the fore end of a probe of a measuring apparatus is brought into contact, are inserted into the fixing holes, respectively, and secured in place. An inspection master block ensuring a high inspection accuracy by minimizing the effect of ambient temperature variation and a method for producing the same are thereby provided.

5 Claims, 12 Drawing Sheets

INSPECTION MASTER BLOCK AND METHOD OF PRODUCING THE SAME

REFERENCE TO RELATED APPLICATIONS

The present application is the national stage under 35 U.S.C. §371 of international application PCT/JP01/00965, filed Feb. 13, 2001 which designated the United States, and which application was not published in the English language.

FIELD OF THE INVENTION

The present invention relates to a testing master block so called an interim testing artifact for inspection or correction of the accuracy of a measuring apparatus such as a three dimensional measuring machine so called a coordinate measuring machine.

DESCRIPTION OF THE RELATED ART

In the past, for the measurement of the dimensions of machine parts such as automobile engines or transmission cases, the measuring apparatus such as coordinate measuring machines, which measure dimensions by bringing the front end of a probe into contact with a measured object set on a measurement table (bed), have been used generally.

This type of measuring apparatus is maintained in accuracy of measurement by using a measurement master finished to a high accuracy to periodically inspect the accuracy or correct measurement error.

The measurement master is provided with a reference measurement plane to which a probe of the measuring apparatus may be brought into contact. By comparing the actually measured data of the reference measurement plane obtained by the measuring apparatus with a reference value, it is possible to inspect or correct the accuracy of the measuring apparatus.

As this type of measurement master proposed in the past, there is for example the measurement master disclosed in Japanese Unexamined Patent Publication (Kokai) No. 11-44527. Measurement hole members are provided respectively at the four corners of each of the top surfaces, one of the side surfaces and the front surface of a cubic hollow box made of cast iron.

Each of these reference hole members is shaped as a cylinder provided with a flange at one end and is bolted to the box with the flange. Further, the inner surface of the cylindrical portion is shaped as a circular hole finished to a high accuracy and forms a reference hole for measurement.

Further, in the master measuring apparatus disclosed-in Japanese Unexamined Patent Publication (Kokai) No. 4-160301, rods formed of a glass material with a coefficient of linear expansion of a value of about 0 are assembled into a grid and fastened to the outside of a cube-shaped or box-shaped hollow support block comprised of a low expansion material. The two end surfaces of the rods form the reference measurement planes, and at least three balls formed by a glass material etc. for setting reference coordinates are attached to the top surface of the support block.

In the inspection master disclosed in the above mentioned Japanese Unexamined Patent Publication (Kokai) No. 11-44527, since the reference hole members are attached to a hollow box made of cast iron, if a portion of the cast iron box expands or contracts due to a change of the ambient temperature, the distance or angle between the reference hole members changes slightly and it will be caused some defects on the inspection accuracy.

Further, in the master measuring apparatus disclosed in Japanese Unexamined Patent Publication (Kokai) No. 4-160301, by using glass material having a linear expansion coefficient of a value of about 0 for rods having two end surfaces as reference measurement planes or balls for setting the coordinates, it is being attempted that the inspection accuracy is improved by holding minimum expansion or contraction of the rods or balls themselves due to a change of the ambient temperature.

However, since the rods or balls are supported by a cast iron box, there are some problems that changes in the dimensions of the parts or warping of the shape of the box due to temperature changes of the box gives a bad influence on the inspection accuracy, the structure becomes complicated and the cost of manufacturing becomes higher.

DISCLOSURE OF THE INVENTION

An objective of the present invention is to provide a testing master block and manufacturing method of the same able to solve the above problems in the prior art and obtain high inspection accuracy by eliminating, as much as possible the effects due to changes in ambient temperature.

To achieve the above objective, the first aspect of the testing master block of the present invention is characterized by being provided with a hollow box-shaped block body with at least a top surface and four side surfaces comprised of quartz glass or single crystal quartz rectangular plates and a plurality of reference members each fastened by insertion to a plurality of mounting holes formed in the top surface and side surfaces of the block body and each having a reference measurement plane to which the front end of a probe of a measuring apparatus may be brought into contact.

Note that the term "rectangular" as used in this specification includes "square" and the term "box-shaped" includes a "cube".

The second aspect of the testing master block of the present invention is characterized by being provided with a hollow cylindrical block body comprised of a side surface of a quartz glass or single crystal quartz cylindrical tube and at least a top surface of a quartz glass or single crystal quartz disk and a plurality of reference members each fastened by insertion to a plurality of mounting holes formed in the top surface and side surface of the block body and each having a reference measurement plane to which the front end of a probe of a measuring apparatus may be brought into contact.

The third aspect of the testing master block of the present invention is characterized by being provided with a block body having at least a top surface and side surfaces and fabricated by being cut out from a single piece of quartz glass or single crystal quartz and a plurality of reference members each fastened by insertion to a plurality of mounting holes formed in the top surface and side surface of the block body and each having a reference measurement plane to which the front end of a probe of a measuring apparatus may be brought into contact.

In the first to third aspects of the testing master block, a reference member comprised of a ceramic ball with a surface serving as a reference measurement plane and a bushing holding the ceramic ball and fastened by insertion into a mounting hole of the block body may be used.

The first aspect of a manufacturing method of a testing master block of the present invention is characterized by comprising a first step of forming mounting holes at predetermined positions of rectangular plates comprised of quartz glass or single crystal quartz, a second step of forming at least a top surface and four side surfaces of a hollow box-shaped block body by joining a plurality of quartz glass or single crystal quartz rectangular plates so that the rectangular plates formed with the mounting holes in the previous step are positioned at least atone of the four side surfaces and the top surface, and a third step of fastening reference members to which the front end of a probe of a measuring apparatus may be brought into contact by insertion into the mounting holes after the second step.

The second aspect of the manufacturing method of a testing master block of the present invention is characterized by comprising a first step of forming mounting holes at predetermined positions of a quartz glass or single crystal quartz disk and a quartz glass or single crystal quartz cylindrical tube, a second step of forming a hollow cylindrical block body by joining a disk formed with mounting holes at the previous step to at least the top surface of the cylindrical tube, and a third step of fastening reference members to which the front end of a probe of a measuring apparatus may be brought into contact by insertion into the mounting holes after the second step.

A third aspect of the manufacturing method of a testing master block of the present invention is characterized by comprising a first step of cutting out a block body having at least a top surface and side surfaces from a single piece of quartz glass or single crystal quartz, a second step of forming mounting holes at predetermined positions of the top surface and side surfaces of the block body formed at the first step, and a third step of fastening reference members to which a front end of a probe of a measuring apparatus may be brought into contact by insertion into the mounting holes after the second step.

In the first to third aspects of the manufacturing method of a testing master block, the reference members after the third step may be finished into reference measurement planes to which a front end of a probe of a measuring apparatus may be brought into contact.

In the testing master block of the present invention (hereinafter referred to as the "master block"), a plurality of reference members formed by a material with a small coefficient of linear expansion such as nonshrinking steel are attached to a block body made of quartz glass or single crystal quartz and reference measurement planes to which a probe of a measuring apparatus may be brought into contact are formed at these reference members.

The block body may be formed using rectangular plates made of quartz glass or single crystal quartz for at least the top surface and the four side surfaces and joining these plates into a hollow box or may be formed using a cylindrical tube and a disk made of quartz glass or single crystal quartz for the side surfaces and at least the top surface and joining these cylindrical tube and disk into a hollow cylinder.

Note that a commercially available instantaneous adhesive is suitable for joining the rectangular plates or the disk and the cylindrical tube.

Further, these reference members are fastened by insertion into mounting holes formed in the rectangular plates or the disk and cylindrical tube by a jig borer or other machine tool in advance before the assembly of the block body.

Further, the block body may be fabricated by being cut out into a block shape or tubular shape from a single piece of quartz glass or single crystal quartz using a diamond tool etc.

After the outer shape of the block body is cut out, mounting holes for insertion of the reference members are formed in the top surface and side surfaces of the block body by a jig borer etc.

Note that the block body cut out from the single material is preferably a hollow shape having a cavity with an open bottom in order to reduce its weight.

On the other hand, these reference members may be fastened by screws or other fastening means to the block body, but at this time, it is preferable to adhere the reference members to the mounting holes by applying an adhesive between the peripheral edges of the mounting holes and the reference members so that the fastening positions of the reference members do not shift.

Further, it is possible to affix the reference members to the mounting holes of the block body by just an adhesive without using screws or other fastening means.

Further, by finishing the reference measurement planes after affixing the reference members to the block body, it is possible to enhance the accuracy of the mounting angles or mounting positions of the reference measurement planes.

Note that the reference members may also be comprised using the surfaces of ceramic balls finished to a high accuracy as the reference measurement planes.

A quartz glass or single crystal quartz material has an extremely small coefficient of linear expansion, so the distance between the reference measurement planes of the reference members attached to the block body and the orientation of the reference measurement planes are almost completely free of the effect of changes in the ambient temperature and a high accuracy can be maintained.

DESCRIPTION OF THE PREFERRED EMBODIMENTS

Figure 1:
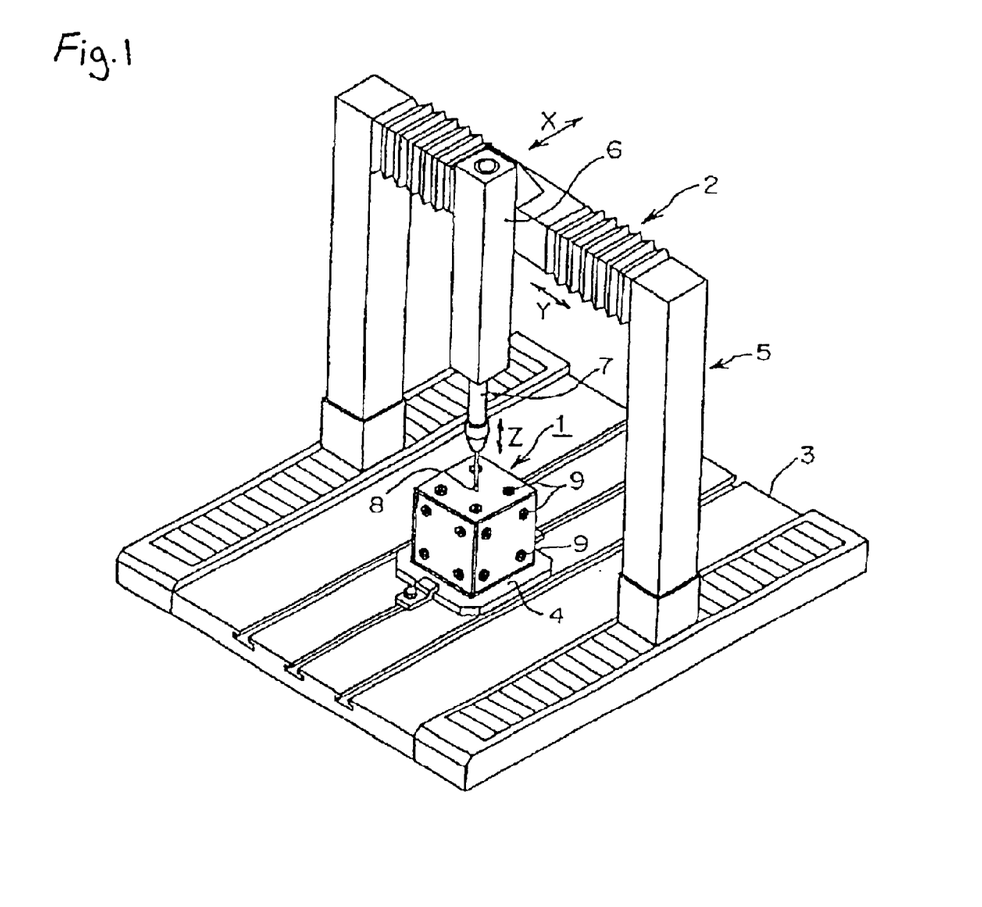
FIG. 1 is a perspective view of the state of setting a testing master block according to the first embodiment of the present invention in a coordinate measuring machine.

Next, embodiments of the present invention will be explained with reference to the drawings. FIG. 1 shows a first embodiment of a master block of the present invention. The master block 1 in the embodiment is fastened to a jig pallet 4 placed on a measurement table 3 of a coordinate measuring machine 2 and is used for inspection or correction of its accuracy.

The coordinate measuring machine 2 is comprised of a gantry-type movable frame 5 supported at the two sides of the measurement table 3 slidably in the X-direction shown in the figure, a head portion 6 slidably supported at the movable frame 5 and slidable in the Y-direction perpendicular to the X-direction, and an elevation shaft 7 supported to be vertically movable in the vertical direction, that is, the Z-direction of the figure, and can move and position the probe 8 fastened to the bottom end of the elevation shaft 7 in three-dimensional directions.

The front end of the probe 8 is comprised of a hard material having wear resistance such as artificial ruby or ceramic formed into a high accuracy spherical shape. In normal measurement work, the coordinate measuring machine 2 brings the front end of the probe 8 into contact with the finished surface of an engine block or other workpiece placed on the measurement table 3, measures the displacement of the probe 8 from the reference position, and inspects if the workpiece is being finished to the prescribed dimensions.

On the other hand, when inspecting the accuracy of the coordinate measuring machine 2 itself, the front end of the probe 8 is brought into contact with the reference measurement plane of a reference member 9 made of nonshrinking steel provided at the master block 1 instead of a workpiece, and the distance between the reference measurement planes of two reference members 9 provided at the master block 1 is actually measured and compared with a reference value so as to investigate the error between the actually measured value and the reference value or calibrate the coordinate measuring machine based on the actually measured error.

Figure 2:
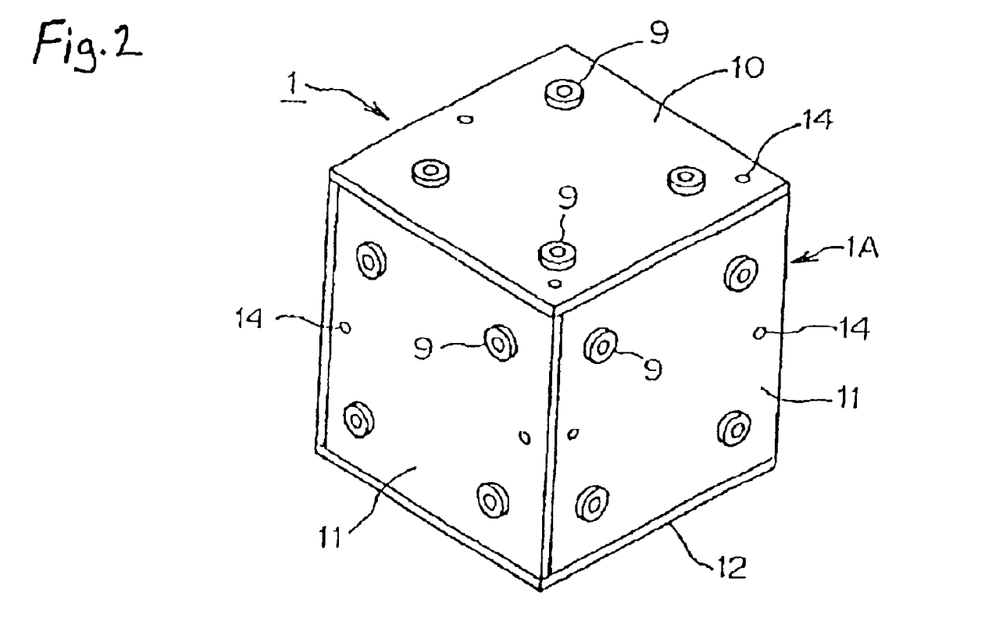
FIG. 2 is a perspective view of a first embodiment of a testing master block of the present invention.

As shown in FIG. 2, the master block 1 is comprised of a substantially box-shaped block body 1A and reference members 9 attached to the top surface and the side surfaces.

The block body 1A is comprised of a top plate 10, side plates 11, and a bottom plate 12 made of quartz glass and formed into substantially rectangular shapes bonded together by an adhesive (commercially available instantaneous adhesive etc.)

Figure 3:
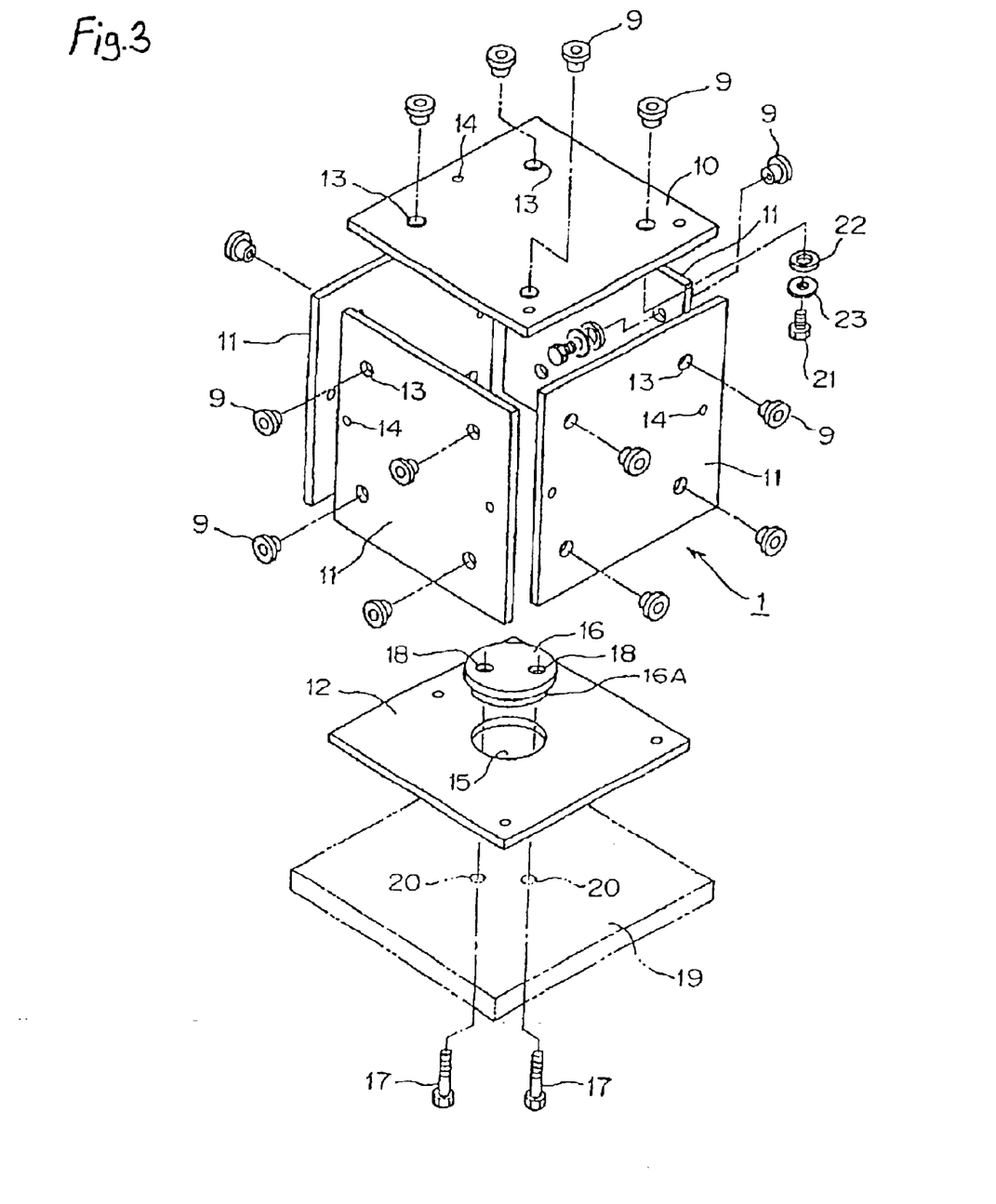
FIG. 3 is a disassembled perspective view of a first embodiment of a testing master block of the present invention.

FIG. 3 is a disassembled perspective view of the master block 1. The top plate 10 and the four side plates 11 are formed with mounting holes 13 for mounting the reference members 9 at the four corners passing through the plates in the thickness direction.

Further, air holes 14 are formed for circulation of air between the inside and outside of the master block 1 at three locations at the top plate 10 and two locations of each of the side plates 11.

Note that these air holes 14 are for preventing a difference in air pressure between the inside and outside of the block body 1A and warping of the block body 1A due a change of the temperature. It is sufficient if an opening is formed for circulation of air in the bottom plate 12.

On the other hand, a circular through hole 15 is formed at the center portion of the bottom plate 12. A small diameter portion 16A of a circular fastening plug 16 is fit into that through hole 15.

The fastening plug 16 is formed with a pair of threaded holes 18 into which two bolts 17 may be engaged.

These bolts 17 are inserted from the bottom into a pair of bolt through holes 20 of a fastening plate 19 provided at the sides of a jig pallet 4 (see FIG. 1) and engaged with the threaded holes 18 of the fastening plug 16 to fasten the master block 1 to the fastening plate 19.

Note that the fastening plug 16 is desirably fabricated by nonshrinking steel or another material resistant to expansion and contraction or warping due to temperature.

Figure 4:
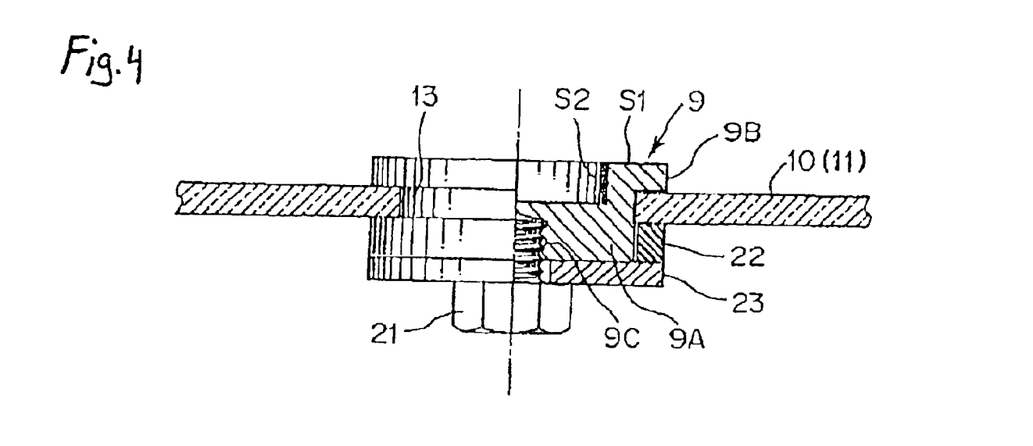
FIG. 4 is a partial sectional view of a structure for mounting a reference member to an upper plate.

Further, each of these reference members 9, as shown in FIG. 4, is comprised of a cylindrical portion 9A having an outer diameter conforming with the mounting holes 13 formed in the top plate 10 or side plates 11 and a flange portion 9B with a diameter larger than the mounting holes 13. A threaded hole 9C into which a bolt 21 may be engaged is formed in the center of the end surface of the cylindrical portion 9A.

The cylindrical portion 9A of the reference member 9 is formed to a length whereby it partially projects out to the rear side of the top plate 10 or the side plates 11 when inserted from the outside of the top plate 10 or the side plates 11 until the flange portion 9B abuts against the peripheral edge of a mounting hole 13.

A collar 22 made of elastic urethane is fit over the projecting portion.

The collar 22 is formed to a length in the axial direction when not subject to compressive force in the axial direction somewhat longer than the length of the projecting portion of the cylindrical portion 9A. When a washer 23 is fastened to the end surface of the cylindrical portion 9A by a bolt 21, the collar 22 is elastically compressed and gripped between the top plate 10 or the side plate 11 and the washer 23, whereby the reference member 9 is fastened to the top plate 10 or the side plate 11.

Note that when fastening a reference member 9 by a bolt 21 to the top plate 10 or a side plate 11, an adhesive (commercially available instantaneous adhesive etc.) may be coated between the contacting portions of the two to prevent a shift of the fastening position of the reference member 9 with respect to the top plate 10 or the side plate 11.

Further, the end surface S1 of the flange portion 9B of a reference member 9 and the inside circumferential surface S2 of the circular depression formed at the center of the end surface S1 are finished to a high accuracy as a reference measurement plane to which the front end of the probe 8 (see FIG. 1) may be brought into contact.

Next, explaining the manufacturing method of the master block 1 configured in the above way, first, six plates, that is, the substantially square top plate 10, side plates 11, and bottom plate 12, made of quartz glass or single crystal quartz shown in FIG. 3 are fabricated. Of these, the top plate 10 and the four side plates are formed with mounting holes 13 for the reference member 9 and air holes 14 by a jig borer or other machine tool. Further, the bottom plate 12 is similarly formed with a circular through hole 15 at its center by a jig borer etc.

Next, the four side plates 11 are assembled into a square tubular shape by adhering one end surface of each to an edge of a rear surface adjoining the end surface at the opposite side of that end surface by an adhesive.

Further, the top surface 10 and the bottom surface 12 are adhered by an adhesive to the upper and lower end surfaces of these four side plates to assemble the block body 1A (see FIG. 2).

Next, the cylindrical portions 9A of the reference member 9 are inserted into the mounting holes 13 from the outside of the block body 1A and fastened by an adhesive. Further, the collars 22 and washers 23 are fit over the reference members 9 as shown in FIG. 4 and the members fastened to the plates 10 and 11 by the bolts 21.

In this way, the reference members 9 are firmly fastened to the block body 1A by the adhesive and the bolts 21.

Note that the work of fitting the collars 22, washers 23, and bolts 21 to the reference members 9 may be performed by inserting the hand or a box spanner or other fastening tool from the through hole 15 formed in the bottom plate 12 inside of the block body 1A. Further, the fastening plug 16 has to be inserted into the block body 1A in advance before the block body 1A finishes being assembled.

After fastening the reference members 9 to the block body 1A in this way, the small diameter portion 16A of the fastening plug 16 is fit into the through hole 15 of the bottom plate 12 and fastened to a jig pallet of a not shown machine tool by the bolts 17 shown in FIG. 3.

Up to this point of time, the end surface S1 of the flange portion 9B of each of the reference members 9 shown in FIG. 4 and the inner circumferential surface S2 of the circular depression formed in the end surface S1 were left unprocessed. The machine tool is used to precision machine the end surfaces S1 and the inner circumferential surfaces S2 of the depressions to precisely form the distances between the inner circumferential surfaces S2 of the depressions of the adjoining reference members 9 to a reference value and to form them so that the angles between the end surfaces S1 of the reference members 9 fastened to the surface perpendicular to the block body 1A becomes precisely 90 degrees, whereby the manufacturing method of the master block 1 is ended.

Figure 5:
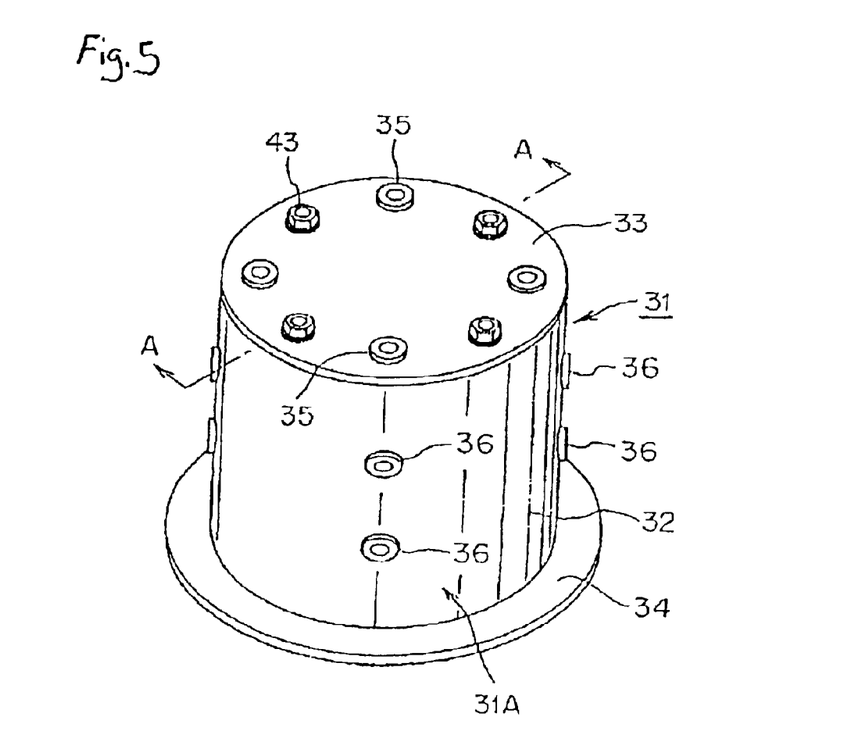
FIG. 5 is a perspective view of a second embodiment of a testing master block of the present invention.
Figure 6:
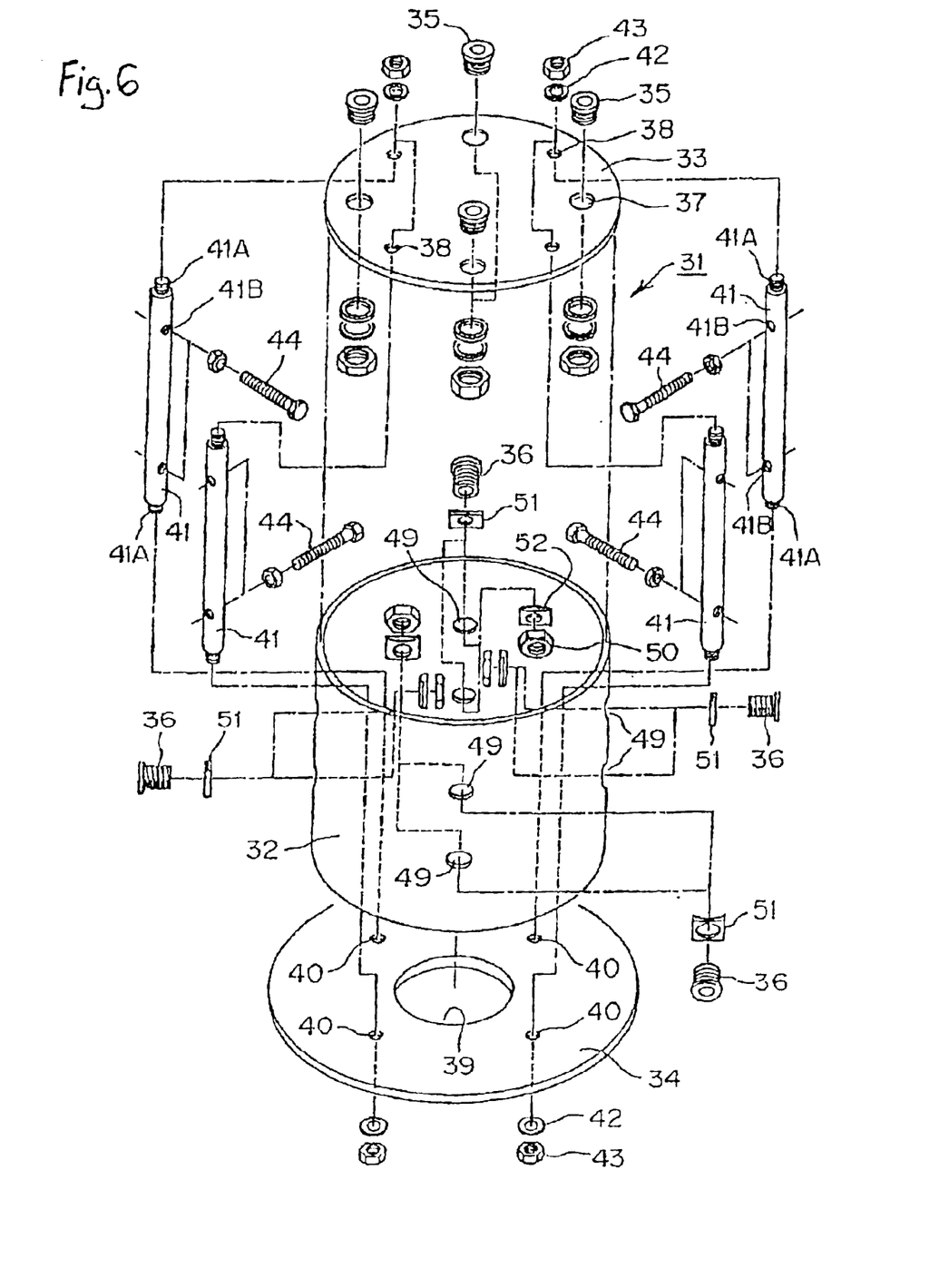
FIG. 6 is a disassembled perspective view of a second embodiment of a testing master block of the present invention.

Next, FIG. 5 is a perspective view of a second embodiment of a testing master block of the present invention, while FIG. 6 is a disassembled perspective view of the same. The master block 31 of the present embodiment is provided with a block body 31A comprised of a cylindrical tube 32 formed with a cylindrical inner surface and made of quartz glass or single crystal quartz, a top plate 33 having a diameter substantially equal to the outside diameter of the cylindrical tube 32, and a bottom plate 34 having a diameter larger than the cylindrical tube 32.

As shown in FIG. 5, the top surface and side surfaces of the block body 31A are provided with reference members 35 and 36 made of nonshrinking steel. Reference members 35 are attached at four locations at equal intervals in the circumferential direction near the outer circumference of the top plate 33. Further, reference members 36 are attached at four locations in the circumferential direction of the cylindrical tube 32 corresponding to the reference members 35, two each in the upper and lower directions, for a total of eight locations.

As shown in FIG. 6, the four mounting holes 37 to which the reference members 35 are attached are formed passing through the top plate at equal intervals in the circumferential direction. Threaded through holes 38 are formed in the top plate 33 at positions shifted 45 degrees each in center angle from the mounting holes 37.

On the other hand, a through hole 39 is formed in the center portion of the bottom plate 34. Further, around the through hole 39, threaded through holes 40 are formed at positions corresponding to the mounting holes 37 formed in the top plate 33 directly above.

Figure 7:
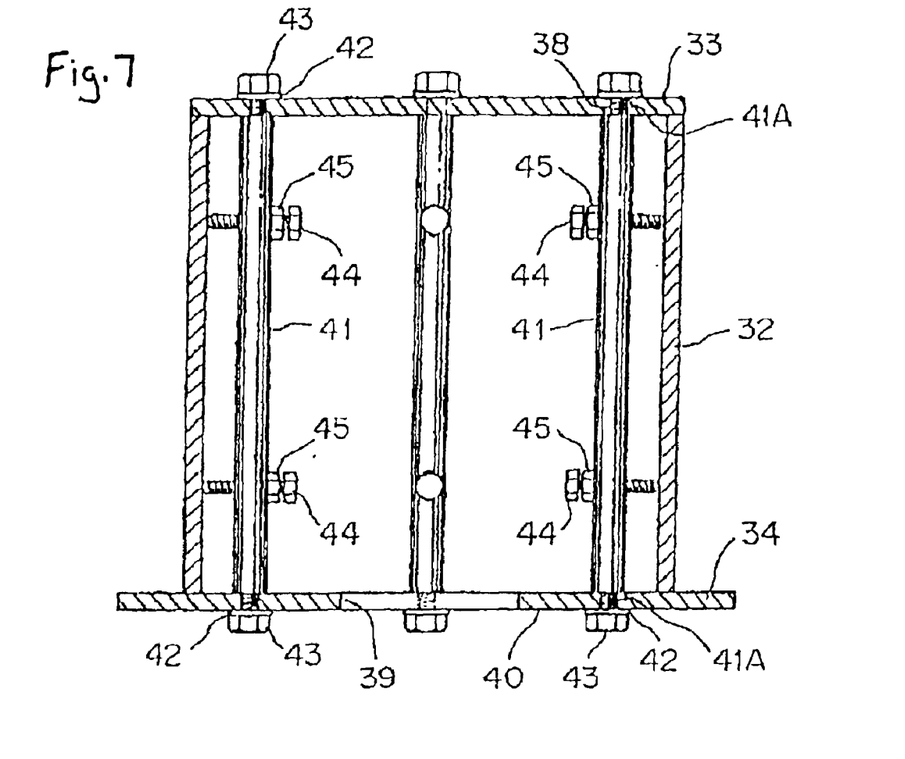
FIG. 7 is a longitudinal sectional view along the line A—A of FIG. 5.

As shown in FIG. 7, the top plate 33 and the bottom plate 34 are connected by the two ends of four connecting rods 41 passing through the cylindrical tube 32 and formed by nonshrinking steel. That is, the connecting rods 41 are shaped symmetrically in the vertical direction and are formed with threaded portions 41A at the upper and lower ends.

These threaded portions 41A are inserted into the threaded through holes 38 and 40 formed at facing positions of the top plate 33 and bottom plate 34. Collars 42 made of urethane polymer and having elasticity are attached to the portions projecting upward from the top plate 33 and portions projecting downward from the bottom plate 34 and are fastened by engagement by nuts 43. The top plate 33 and the bottom plate 34 are connected integrally across the cylindrical tube 32.

Note that the portions of the connecting rods 41 other than the threaded portions 41 at the two ends have lengths which are substantially equal to the length of the cylindrical tube 32 in the axial direction and have outer diameters which are formed larger than the threaded through holes 38 and 40 formed at the top plate 33 and the bottom plate 34.

Further, each of the connecting rods 41 is formed with threaded holes 41B at two locations separated from each other in the longitudinal direction in a direction perpendicular to the longitudinal direction. Positioning bolts 44 are engaged with these threaded holes 41B.

These positioning bolts 44 face the outside in the radial direction in the cylindrical tube 32 and abut against the inner circumferential surface of the cylindrical tube 32 at their front ends, whereby the center of the cylindrical tube 32 is matched with the center of the top plate 33 and the bottom plate 34.

Further, lock nuts 45 are engaged with the positioning bolts 44. These lock nuts 45 fasten the engagement position of the positioning bolts 44 adjusted in position with respect to the connecting rods 41.

Figure 8:
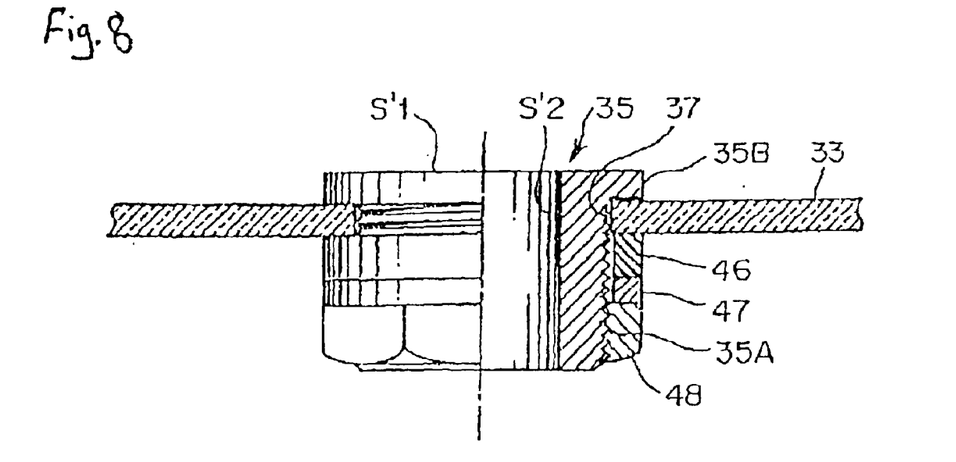
FIG. 8 is a partial sectional view of a structure for mounting a reference member to an upper plate.

Next, FIG. 8 is a partial sectional view of the mounting structure of a reference member 35 to the top plate 33. The reference member 35 is comprised of a threaded portion 35A which is passed through a mounting hole 37 formed in the top plate 33 and a flange portion 35B having an outside diameter larger than the diameter of the mounting hole 37 exposed at the surface of the top plate 33.

The reference member 35 is formed with a through hole at its center across the total length in the axial direction. The end surface S'1 of the flange portion 35B and the inner circumferential surface S'2 of the through hole are finished to a high accuracy as reference measurement planes to which the front end of a probe 8 (see FIG. 1) may be brought into contact in the same way as the reference member 9 in the first embodiment.

Further, the threaded portion 35A has a length projecting out to the rear surface of the top plate 33 at the position inserted into the mounting hole 37 up to where the flange portion 35B abuts against the front surface of the top plate 33. An urethane polymer collar 46 having elasticity and a washer 47 are fit over the projecting portion. Further, the reference member 35 is fastened to the top plate 33 by engagement of a nut 48.

Note that in the reference member 35 in the present embodiment, in the same way as the reference member 9 of the first embodiment, the contact portions of the top plate 33 and reference member 35 are adhered by an adhesive so as to prevent a shift in position of the reference member 35 fastened to the top plate 33.

Figure 9:
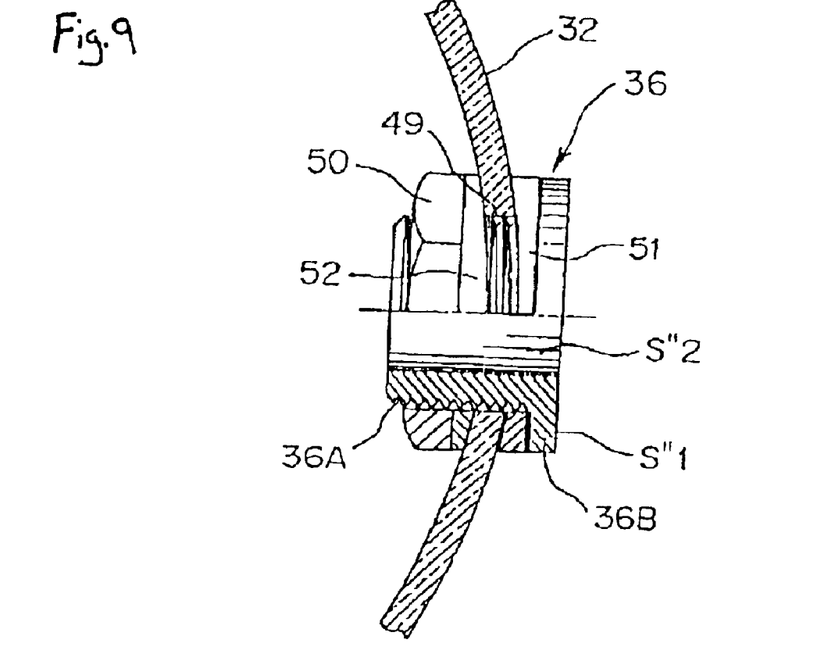
FIG. 9 is a partial sectional view of a structure for mounting a reference member to a cylindrical tube.

Next, FIG. 9 is a partial sectional view showing the mounting structure of a reference member 36 to the cylindrical tube 32. The reference member 36 has a shape similar to the reference member 35 and is comprised of a threaded portion 36A and a flange portion 36B. A through hole is formed in the center through the entire length in the axial direction. The end surface S"1 of the flange portion 36B and the inner circumferential surface S"2 of the through hole are finished to a high accuracy as reference measurement planes.

The threaded portion 36A of the reference member 36 is inserted into a mounting hole 49 formed passing through the cylindrical tube 32 in the radial direction and fastened by engagement of a nut 50 from the inside of the cylindrical tube 32. To deal with the curvature of the inner and outer circumferential surfaces of the cylindrical tube 32, an outer collar 51 and inner collar 52 formed at the centers with holes through which the threaded portion 36A may pass are arranged at the outside and inside of the cylindrical tube 32.

The surfaces of the outer collar 51 and the inner collar 52 abutting against the inner and outer circumferential surfaces of the cylindrical tube 32 are formed by a concave curved surface and a convex curved surface conforming to the radii of curvature of the inner and outer circumferential surfaces so that no bending stress is generated inside the cylindrical tube 32 due to the fastening by the nut 50 engaged with the threaded portion 36A.

These outer collar 51 and inner collar 52 are fabricated from nonshrinking steel. The outer collar 51 and the flange portion 36B of the reference member 36 and the outer collar 51 and the cylindrical tube 32 are adhered by an adhesive.

Next, explaining the manufacturing method of a master block 31 comprised as mentioned above, first a cylindrical tube 32, top plate 33, and bottom plate 34 made of quartz glass or single crystal quartz as shown in FIG. 6 are fabricated.

Here, the mounting holes 49 of the cylindrical tube, the mounting holes 37 and the threaded through holes 38 of the top plate 33, and the through hole 39 and the threaded through holes 40 of the bottom plate 39 are formed by a jig borer or other machine tool.

Note that the threaded through holes 38 of the top plate 33 and the threaded through holes 40 of the bottom plate 34 are desirably formed with the top plate and the bottom plate 34 superposed concentrically so as to prevent deviation of the machining position.

Next, four connecting rods 41 fabricated in advance are inserted into the cylindrical tube 32 in the state with the positioning bolts 44 and the lock nuts 45 attached. The threaded portions 41A of the two ends of each are inserted into the threaded through holes 38 of the top plate 33 and the threaded through holes 40 of the bottom plate, fitted with washers 42, and loosely fastened by nuts 43.

Next, the front ends of the positioning bolts 44 are made to abut against the inside circumferential surface of the cylindrical tube 32 and are precisely adjusted in position so that the cylindrical tube 32, the top plate 33, and the bottom plate 34 become concentric and are fastened by lock nuts 45 at the adjusted position so that the positioning bolts 44 do not turn.

Next, nuts 43 are fastened to integrally connect the cylindrical tube 32, the top plate 33, and the bottom plate 34 to complete the assembly of the block body 31A.

Note that an adhesive is preferably coated to adhere the top and bottom end surfaces of the cylindrical tube 32 and the top plate 33 and bottom plate 34.

After the assembly of the block body 31A is completed, the reference members 35 and 36 are attached to the mounting holes 37 of the top plate 33 and the mounting holes 49 of the cylindrical tube 32. At that time, the threaded portions 35A of the reference members 35 are inserted from the outside from the mounting holes 37 of the top plate 33, then the flange portions 35B and peripheral edges of the mounting holes 37 of the top plate are adhered by an adhesive.

Further, the collars 46 and washers 47 are fit to the threaded portions 35A from the inside of the top plate 33 as shown in FIG. 8 and fastened by engagement with nuts 48.

Further, the threaded portions 36A of the reference members 36 to which the outer collars 51 are fit as shown in FIG. 9 are inserted from the outside into the mounting holes 49 of the cylindrical tube 32. The outer surfaces and the inner surfaces of the outer collars 51 are adhered by an adhesive to the outer circumferential surfaces of the flange portion 36B and the cylindrical tube 32.

The inner collars 52 are fit over the threaded portions 36A projecting to the inside of the cylindrical tube 32 and fastened by engagement with nuts 50.

Note that the work of fitting the collars 46, washers 47, and inner collars 52, nuts 48 and 50 over the reference members 35 and 36 in the block body 31 may be performed by inserting the hand or a box spanner or other fastening tool from the through hole 39 formed in the bottom plate 34 inside of the block body 31A in the same way as the through hole 15 formed in the bottom plate 12 of the first embodiment explained above.

Further, the through hole 39 serves also as an air hole for preventing a difference of air pressure between the inside and outside of the block body 31A and deformation of the block body 31A due to changes in the ambient temperature.

After the reference members 35 and 36 finish being attached to the block body 31A, the portion of the bottom plate 34 of the block body 31A projecting outside the cylindrical tube 32 in a flange manner is fastened to the fastening member of the jig pallet of a not shown machine tool. Further, the still not yet finished end surfaces S'1 and inner circumferential surfaces S'2 of the through holes of the flange portions 35A of the reference members 35 and the end surfaces S"1 and inner circumferential surfaces S"2 of the through holes of the flange portions 36A of the reference members 36 are precision machined, thereby completing the manufacturing method of the master block 31.

Note that in the present embodiment, the end surfaces S'1 of the reference members 35 and the end surfaces S"1 of the reference members 36 are finished to form precisely right angles with each other. Further, they are finished so that the center positions of the inner circumferential surfaces S'2 of the through holes of the reference members 35 and the inner circumferential surfaces S"2 of the through holes of the reference members 36 are arranged at every 90 degrees center angle with respect to the center of the block body 31A.

Figure 10:
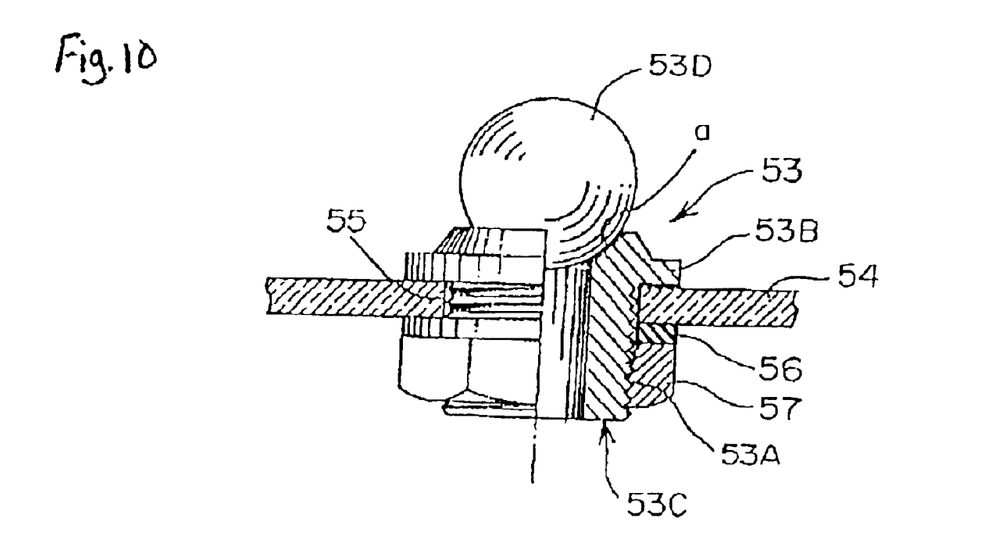
FIG. 10 is a partial sectional view of another aspect of a reference member.

Next, FIG. 10 shows another example of a reference member. The reference member 53 shown in the figure is comprised of a hollow bush 53C having a threaded portion 53A and flange portion 53B and a ceramic ball 53D.

The ceramic ball 53D uses the surface as a reference measurement plane and is finished precisely to a predetermined diameter. It is fastened by an adhesive to a fastening seat "a" formed at part of the spherical surface of the bush 53C conforming to the ceramic ball 53D.

In the same way as the master blocks 1 and 31 of the above embodiments, the threaded portion 53A of the reference member 53 is inserted from the outside into the mounting hole 55 of the quartz glass or single crystal quartz plate 54 comprising the block body, an elastic urethane polymer collar 56 is fit over the threaded portion 53A from the rear side of the plate 54, and this is fastened by engagement of a nut 57.

Note that in the master blocks 1 and 31 of the embodiments discussed above, the block bodies 1A and 31A are provided with bottom plates 12 and 34 comprised of quartz glass or single crystal quartz, but these bottom plates 12 and 34 may also be omitted and portions other than the bottom plates such as the side plates 11 or cylindrical tube 32 may be fastened directly to the jig pallet etc.

Figure 11:
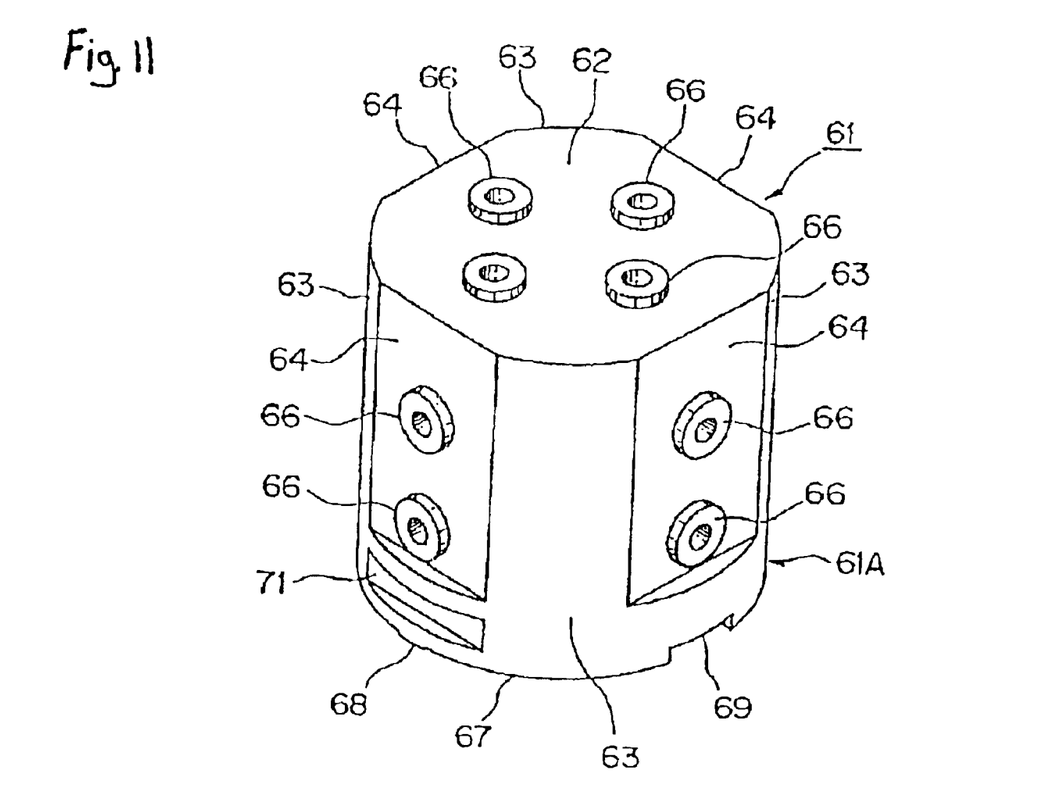
FIG. 11 is a perspective view of a third embodiment of a master block body of the present invention.
Figure 12:
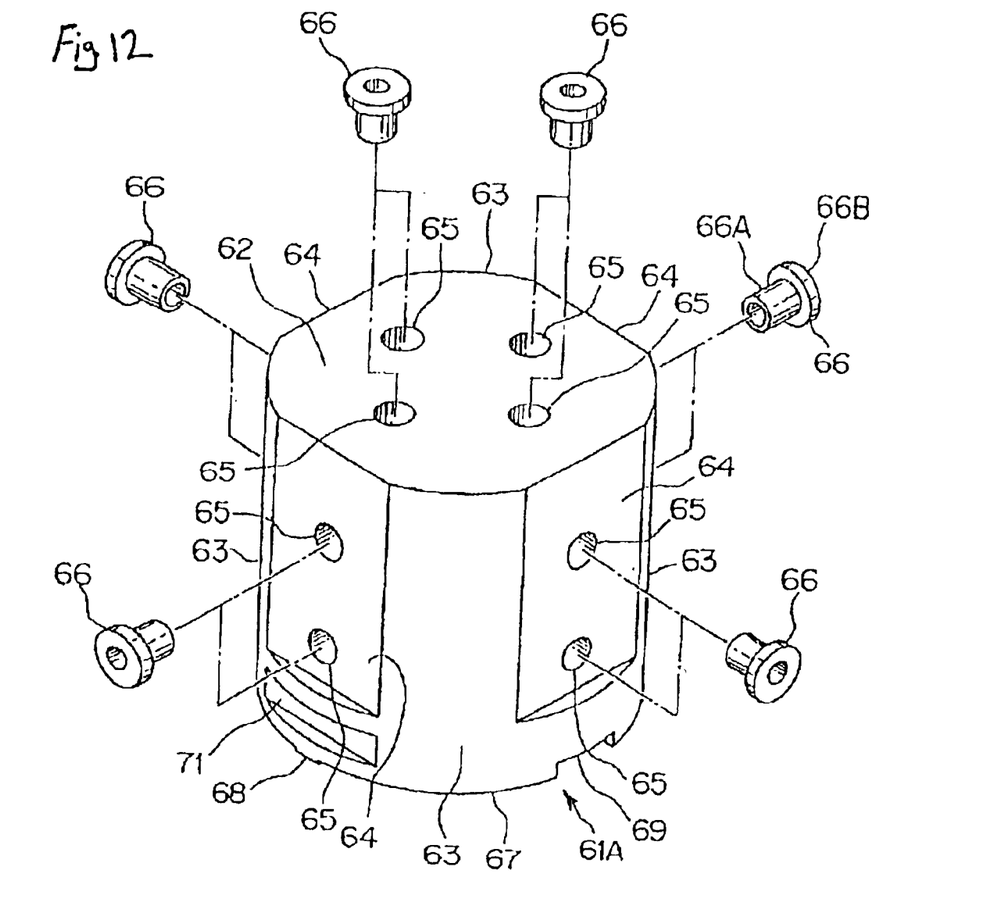
FIG. 12 is a disassembled perspective view of the third embodiment of a master block body of the present invention.
Figure 13:
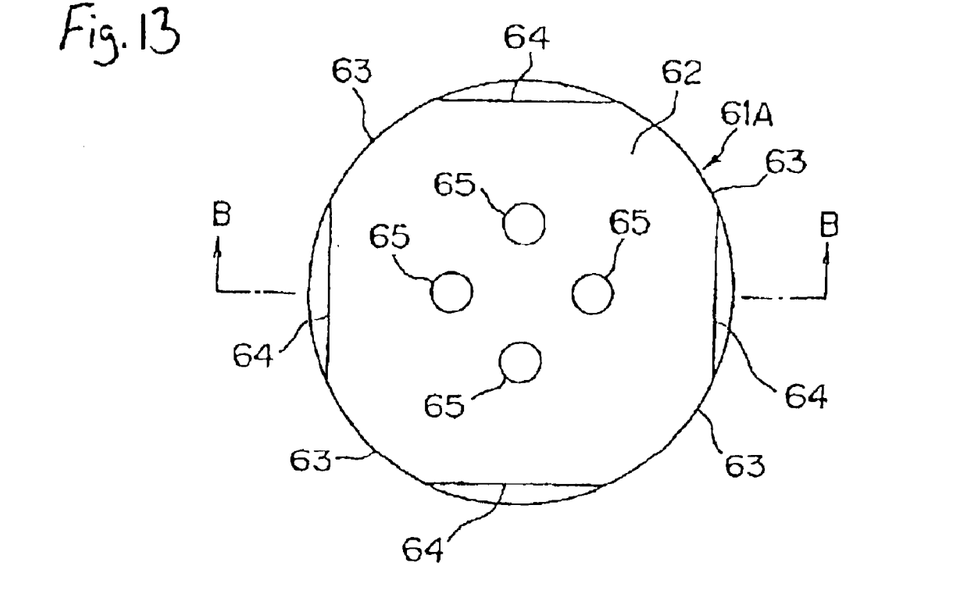
FIG. 13 is a plane view of the third embodiment of a master block body of the present invention.

Next, FIG. 11 is a perspective view of a third embodiment of a testing master block of the present invention, FIG. 12 is a disassembled perspective view of the same, and FIG. 13 is a plane view. The master block 61 of the present embodiment is provided with a block body 61A fabricated by being cut out from a single piece of quartz glass or single crystal quartz.

Figure 14:
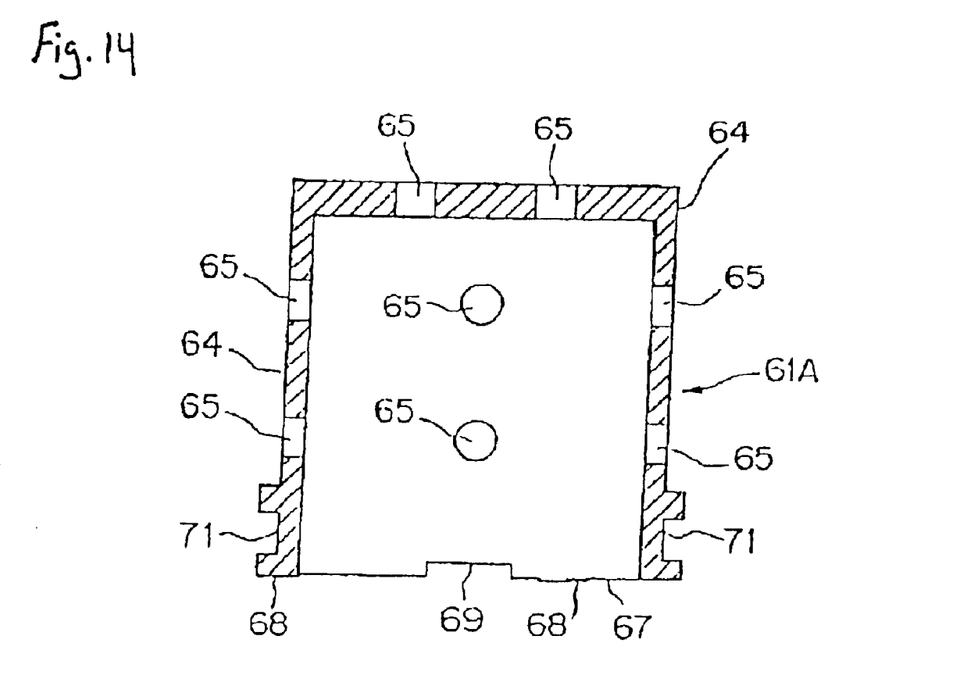
FIG. 14 is a longitudinal sectional view along the line B—B of FIG. 13.

The block body 61A has a smooth top surface 62 and has flat surfaces 64 at four locations in the circumferential direction extending from the top end to close to the bottom end of the cylindrical outer circumference 63. Further, inside, to reduce the weight, is formed a space opened at the bottom as shown in FIG. 14.

The block body 61A is formed with mounting holes 65 at four locations in its top surface 62 and at two locations each above and below in each of its four flat surfaces 64. Reference members 66 are fastened to these mounting holes 65.

These reference members 66 have tubular parts 66A and flange parts 66B. They are similar to those used in the above embodiments, but the reference members 66 of this embodiment are fastened by just an adhesive in the state with the tubular parts 66A inserted into the mounting holes 65.

Figure 15:
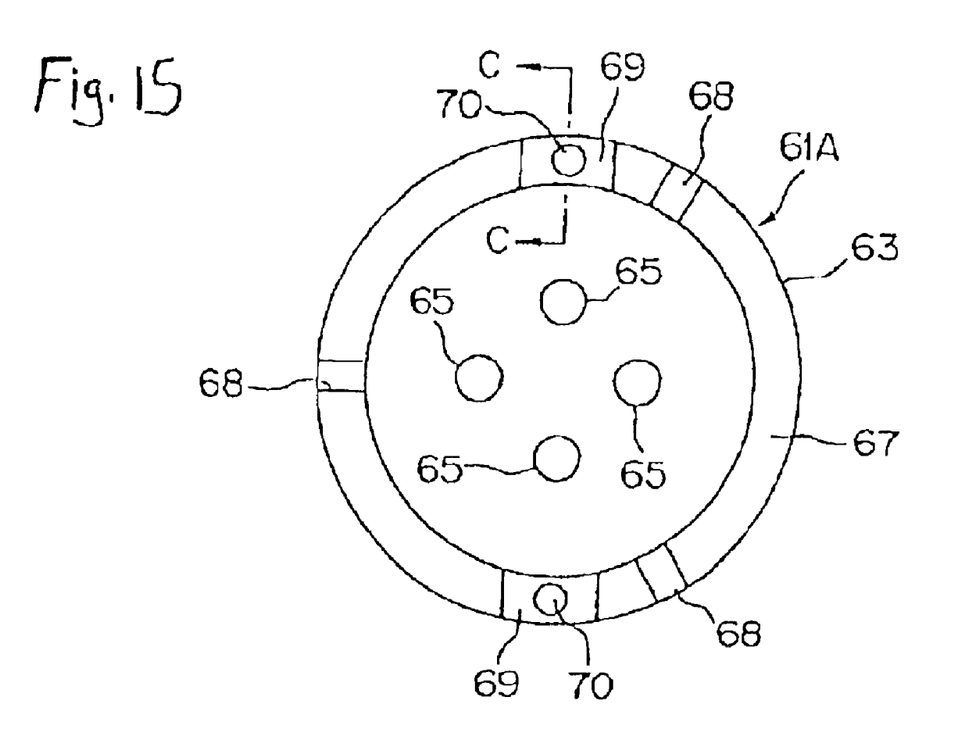
FIG. 15 is a bottom view of the third embodiment of a master block body of the present invention.

FIG. 15 is a view of the block body 61A seen from below. As shown in the figure, the bottom surface 67 of the block body 61A is formed at three locations at equal intervals in the circumferential direction with projecting legs 68 with smooth bottom surfaces for stable placement of the block body 61A on the measurement table of a coordinate measuring machine.

Figure 16:
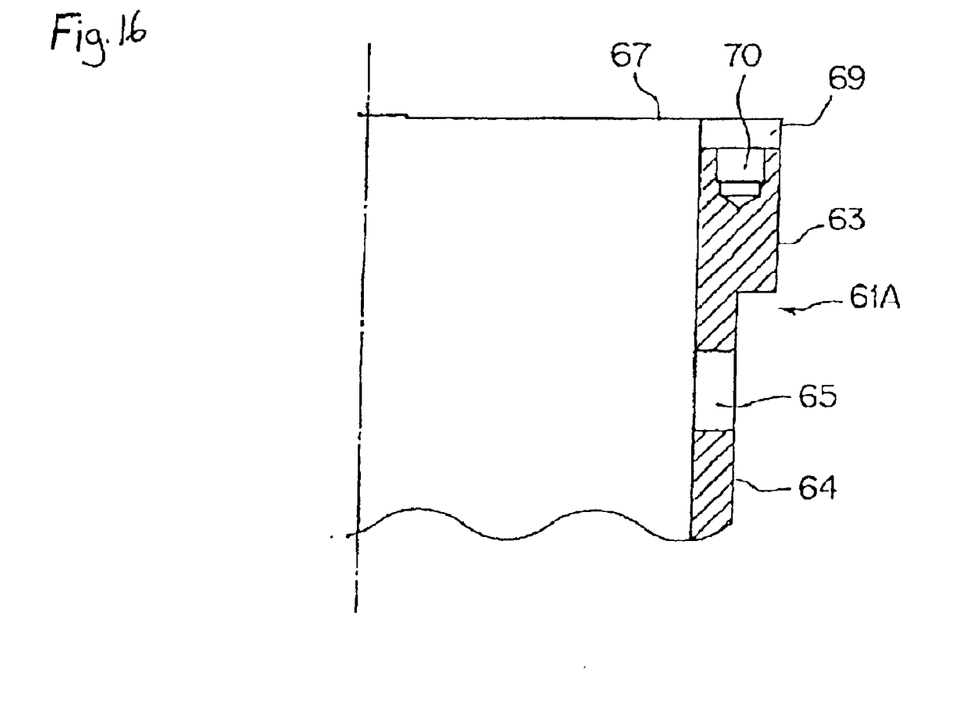
FIG. 16 is a partial sectional view along the line C—C of FIG. 15.

As shown in FIG. 16, the bottom surface 67 is formed with shallow recesses 69 at two facing locations in a single diametrical direction of the block body 61A. Each of these recesses 69 is formed with a positioning hole 70 for insertion of a positioning pin projecting out at a measurement table side of the coordinate measuring machine.

In the master block 61 of the present embodiment, below a facing two of the four flat surfaces 64 formed by partially cutting away the cylindrical outer circumference 63 of the block body 61A, pairs of holding grooves 71 are formed in parallel with these flat surfaces 64.

These pairs of holding grooves 71 are for insertion of supporting forks mounted to a setting device for moving and setting the master block 61 at a measurement position on a measurement table of a coordinate measuring machine. The master block 61 is lifted by the supporting forks of the setting device, moved from a retracted position to the measurement position on the measurement table, and lowered on to the measurement table there at the time of inspection of the accuracy of the coordinate measuring machine.

At that time, the master block 61 is supported at a fixed position on the measurement table by the three legs 68 formed on the bottom surface 67 in the state positioned with respect to the measurement table by insertion of the positioning pins projecting out from the measurement table side into the pair of positioning holes 70 formed in the block body 61A.

Note that as such a setting device, it is possible to use the one already proposed by the present inventor and filed for in Japanese Patent Application No. 2000-017583.

Further, as the master block 61 of the present embodiment, it is possible to use one having ceramic balls instead of the reference members 66 as shown in FIG. 10.

Next, explaining the manufacturing process of the above master, block 61, first, the outer shape of the block body 61A is cut out from a single piece of quartz glass or single crystal quartz by a machine using a diamond tool etc. At that time, to lighten the block body 61A, a cavity with an open bottom is formed.

Next, mounting holes 65 for mounting the reference members 66 are formed by a jig borer or other machine in the top surface 62 and side surfaces 64 formed at the block body 61A.

After forming the mounting holes 65, the tubular members 66A of the reference members 66 are inserted into the mounting holes 65 until their flange parts 66B abut against them.

At that time, an adhesive is used between the inner circumferences of the mounting holes 65 and the tubular parts 66A of the reference members 66 or between the top surface 62 or side surfaces 64 of the block body and the flange parts 66B of the reference members 66, or both, to adhere the reference members 66 to the block body 61A.

After adhering the reference members 66 to the block body 61A in this way, the measurement planes of the reference members 66 are finished to predetermined accuracies to complete the master block 61.

INDUSTRIAL APPLICABILITY

Summarizing the effects of the invention, as explained above, according to the aspect of the invention set forth in claim 1, since a hollow box-shaped block body is comprised by rectangular plates made of quartz glass or single crystal quartz and since a plurality of reference members having reference measurement planes to which the front end of a probe of a measuring apparatus may be brought into contact are fastened by insertion into mounting holes formed in the top surface and side surfaces, there is almost no expansion or contraction of the block body due to changes in the ambient temperature, it is possible to maintain the distance or angle of the reference measurement planes of the reference members constant at a high accuracy, and it is possible to improve the inspection accuracy.

According to the aspect of the invention set forth in claim 2, in the same way as the aspect of the invention set forth in claim 1, there is almost no expansion or contraction of the block body due to changes in the ambient temperature, it is possible to maintain the distance or angle of the reference measurement planes of the reference member constant at a high accuracy, and it is possible to improve the inspection accuracy. Further, due to the use of a quartz cylindrical tube for the side portion of the block body, the assembly becomes easier and the manufacturing cost can be reduced.

According to the aspect of the invention set forth in claim 3, since the block body to which the reference members are fastened is fabricated by being cut out from a single piece of quartz glass or single crystal quartz, the block body has a high rigidity and is substantially free from expansion or shrinkage due to changes in temperature. Therefore, it is possible to maintain the intervals or angles between the reference measurement planes of a plurality of reference members at a higher accuracy.

Further, according to the aspect of the invention of claim 4, in addition to the effects of the aspects of the invention as set forth in claims 1 to 3, since the reference member is comprised by a ceramic ball having its surface as a reference measurement plane and a bushing fastened by insertion into a mounting hole of the block body, the wear of the reference measurement plane is reduced and a high accuracy can be maintained over a long period.

Further, according to the aspect of the invention of claim 5, since at least the top surface and four side surfaces of the hollow box-shaped block body are formed by joining rectangular plates comprised of quartz glass or single crystal quartz, even if an expensive material such as quartz glass or single crystal quartz is used, it is possible to fabricate the body relatively inexpensively, it is possible to lighten the weight of the block body, and it is possible to facilitate the assembly and reduce the cost of manufacture.

Further, according to the aspect of the invention of claim 6, due to the use of a quartz cylindrical tube, the assembly of the block body becomes easier and the manufacturing cost can be reduced compared with the manufacturing method of the aspect of the invention set forth in claim 5.

Further, according to the aspect of the invention of claim 7, since the mounting holes of the reference members are formed after cutting out the block body from a single piece of quartz glass or single crystal quartz, it is possible to further improve the accuracy of the positions or angles of the mounting holes compared with a block body assembled by joining a plurality of portions formed in advance with mounting holes.

Further, according to the aspect of the invention of claim 8, it is possible to form a reference measurement plane of a reference member with a high accuracy without being influenced by the processing accuracy of the mounting holes formed in the block body.

In this case, when forming the block body by cutting it out from a single piece of quartz glass or single crystal quartz, since the block body with the reference members fastened to it is high in rigidity, it is possible to finish the reference measurement planes with a higher accuracy.

While the invention has been described with reference to specific embodiments chosen for purposes of illustration, it should be apparent that numerous modifications could be made thereto by those skilled in the art without departing from the basic concept and scope of the invention.

What is claimed is:

1. A testing master block body characterized in comprising: a hollow cylindrical block body comprised of a side surface of a quartz glass or single crystal quartz cylindrical tube and at least a top surface of a quartz glass or single crystal quartz disk and a plurality of reference members each fastened by insertion to a plurality of mounting holes formed in the top surf ace and aide surfaces of the block body and each having a reference measurement surface to which a front end of a probe of a measuring apparatus may be brought into contact.

2. A testing master block according to claim 1, wherein at least one of said reference members comprises a ceramic ball with a surface serving as the reference measurement surface and a bush holding the ceramic ball and fastened by insertion into a mounting hole of the block body is provided.

3. A manufacturing method of a testing master block characterized in comprising: a first step of forming mounting holes at predetermined positions of rectangular plates comprised of quartz glass or single crystal quartz, a second step of forming at least a top surface and four side surfaces of a hollow box-shaped block body by joining a plurality of quartz glass or single crystal quartz rectangular plates so that the rectangular plates formed with the mounting holes in the previous step are positioned at least at one of the four side surfaces and the top surface, and a third step of fastening reference members to which a front end of a probe of a measuring apparatus may be brought into contact by insertion into the mounting holes after the second step.

4. A manufacturing method of a testing master block characterized in comprising: a first step of forming mounting holes at predetermined positions of a quartz glass or single crystal quartz disk and a quartz glass or single crystal quartz cylindrical tube, a second step of forming a hollow cylindrical block body by joining at least the disk formed with mounting holes from the previous step to the top surface of the cylindrical tube, a third step of fastening reference members to which a front end of a probe of a measuring apparatus may be brought into contact by insertion into the mounting holes after the second step.

5. A manufacturing method of a testing master block according to claim 3 or 4, further comprising finishing the reference members after the third step to have reference measurement surfaces to which a front end of a probe of a measuring apparatus may be brought into contact.

* * * * *